US011164157B2

(12) United States Patent
Kalisz

(10) Patent No.: US 11,164,157 B2
(45) Date of Patent: Nov. 2, 2021

(54) INTERNET OF THINGS BASED SCHEDULER

(71) Applicant: SAP SE, Walldorf (DE)

(72) Inventor: Karol Kalisz, Wiesloch (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 15/611,566

(22) Filed: Jun. 1, 2017

(65) Prior Publication Data

US 2018/0349856 A1 Dec. 6, 2018

(51) Int. Cl.
*G06Q 10/10* (2012.01)
*H04N 7/15* (2006.01)
*G06Q 10/06* (2012.01)

(52) U.S. Cl.
CPC . *G06Q 10/1095* (2013.01); *G06Q 10/063116* (2013.01); *H04N 7/15* (2013.01)

(58) Field of Classification Search
CPC .. G06Q 10/109; G06Q 10/1095; G06Q 10/10; G06Q 30/02; G06Q 10/02; G06Q 10/1093; G06F 16/438; H04W 4/02; G05F 1/66
See application file for complete search history.

(56) References Cited

U.S. PATENT DOCUMENTS

| 2006/0167725 | A1* | 7/2006 | Grunspan | G06Q 10/02 705/5 |
| 2010/0076951 | A1* | 3/2010 | Lyle | H04W 4/21 707/706 |
| 2014/0181696 | A1* | 6/2014 | Christensen | G06Q 10/107 715/756 |

(Continued)

FOREIGN PATENT DOCUMENTS

JP 2014182408 A * 9/2014

OTHER PUBLICATIONS

Is L. Due Tran et al., "A smart meeting room scheduling and management system with utilization control and ad-hoc support based on real-time occupancy detection," 2016 IEEE Sixth (ICCE), 2016, pp. 186-191 [online], [retrieved on Jun. 16, 2021], https://ieeexplore.IEEE.org/document/7562634?source=IQplus (Year: 2016).*

(Continued)

*Primary Examiner* — Jerry O'Connor
*Assistant Examiner* — Michael R Koester
(74) *Attorney, Agent, or Firm* — Mintz Levin Cohn Ferris Glovsky and Popeo, P.C.

(57) ABSTRACT

A method can include receiving a request to determine a site and a timeslot for an event that requires attendance by a first and second user. Sensor data can be retrieved in response to the request. The sensor data can indicate a current occupancy of multiple sites and a current location of the first and second user. When the first and second user are available for an immediate timeslot, a first site for the event can be identified based on the sensor data. An upcoming timeslot for the event and a second site can be identified based on scheduling data. The scheduling data can indicate a future occupancy of the sites, a future location of the first and second user, and a future availability of the first and second user. An event notification indicating the site and timeslot for the event can be sent to the first and second user.

15 Claims, 6 Drawing Sheets

(56) References Cited

U.S. PATENT DOCUMENTS

| | | | | |
|---|---|---|---|---|
| 2014/0379404 A1* | 12/2014 | Bastide | ............. | G06Q 10/1095 |
| | | | | 705/7.19 |
| 2016/0004981 A1* | 1/2016 | Wang | .................... | G06Q 10/02 |
| | | | | 705/6 |
| 2016/0063449 A1* | 3/2016 | Duggan | ............. | G06Q 10/1095 |
| | | | | 705/7.19 |
| 2016/0247122 A1* | 8/2016 | Wong | ................. | G06Q 10/1095 |
| 2017/0357915 A1* | 12/2017 | Holmes | ................. | G06Q 10/02 |

OTHER PUBLICATIONS

Instant Meeting Scheduling, "Scheduling AI." URL: https://x.ai (8 pages).

Online Meeting Scheduler, "Quick and easy online meeting scheduler and meeting organizer." URL: https://doodle.com/meeting-scheduler (5 pages).

* cited by examiner

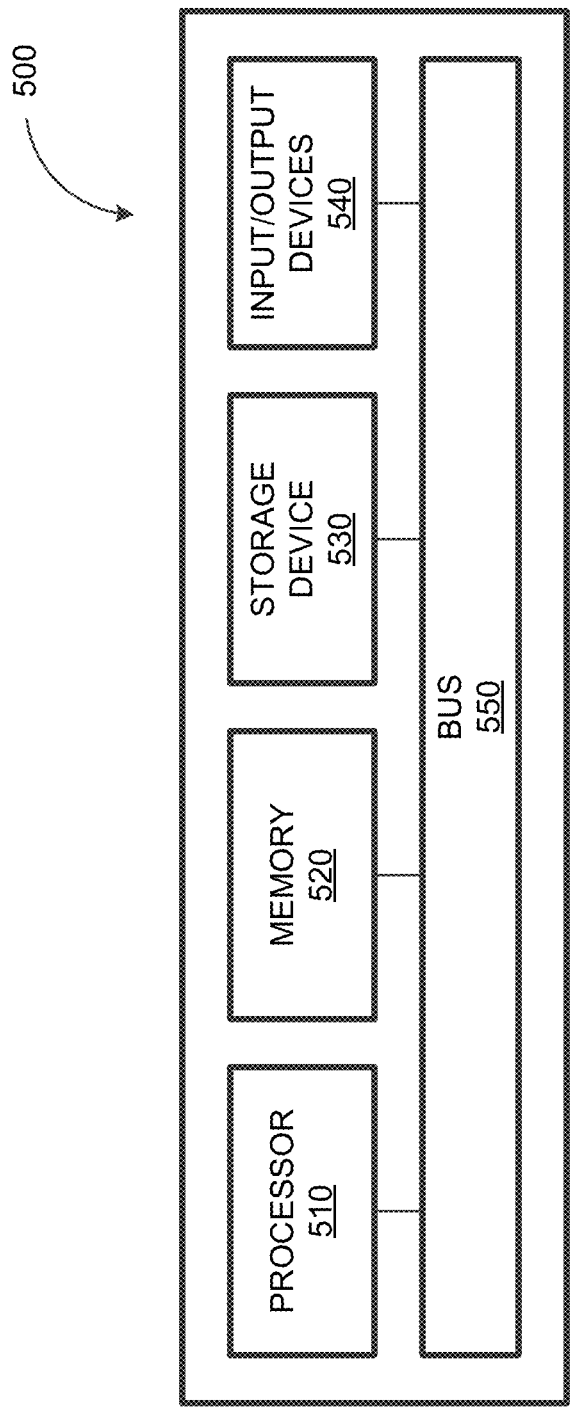

INTERNET OF THINGS BASED SCHEDULER

TECHNICAL FIELD

The subject matter described herein relates generally to network computing and more specifically to internet-of-things (IoT) based scheduling.

BACKGROUND

The Internet of things (IoT) refers to a group of objects that engage in machine-to-machine communication. For example, commonplace objects such as automobiles, household appliances, and wearables, can be embedded with electronic, software, sensors, actuators, and network connectivity to enable these objects to collect and exchange data.

SUMMARY

Systems, methods, and articles of manufacture, including computer program products, are provided for an IoT-based scheduler. In one aspect, there is provided a computer implemented method. The method may include: receiving a request to determine a site and a timeslot for an event, the event requiring attendance by at least a first user and a second user; retrieving, in response to the request, sensor data, the sensor data indicative of a current occupancy of a plurality of sites, and the sensor data further indicative of a current location of the first user and the second user; when the first user and second user are available for an immediate timeslot for the event, identifying, based at least on the sensor data, a first site from the plurality for holding the event; identifying, based at least on scheduling data, an upcoming timeslot for the event and a second site from the plurality for the event, the scheduling data indicative of a future occupancy of the plurality of sites, a future location of the first user and the second user, and a future availability of the first user and the second user; and sending, to a first device of the first user and a second device of the second user, a notification for the event, the notification indicating at least one identified timeslot and site from the plurality of sites for holding the event.

In some variations, one or more features disclosed herein including the following features can optionally be included in any feasible combination. The method can further include determining whether the first site is available for holding the event at the immediate timeslot. The determination can include: determining, based at least on the sensor data, whether at least one of the plurality of sites is currently unoccupied; and determining, based at least on the scheduling data, whether both the first user and the second user are available during the immediate timeslot.

In some variations, the method can further include: based on the identified first site and both the first user and the second user being available during the immediate timeslot, determining, based at least on the scheduling data, whether the first site is unoccupied for an entire duration of the event; and based on the first site not being unoccupied for the entire duration of the event, determining the upcoming timeslot.

In some variations, the method can further include: based on the first site being unoccupied for the entire duration of the event: determining, based at least on the sensor data, a first distance from a first current location of the first user and a second current location of the second user to the first site; determining, based at least on the sensor data, a second distance from the first current location of the first user and the second current location of the second user to a second site; and selecting the first site instead of the second site based at least on the first distance being less than the second distance.

In some variations, the method can further include: determining, based at least on the scheduling data, that the first site is reserved for another event; and updating the scheduling data to release the first site based at least on the first site having being unoccupied for a threshold quantity of time past a start time of the other event.

In some variations, the identification of the upcoming timeslot can include: identifying, based at least on the scheduling data, at least one timeslot before a deadline of the event during which both the first user and the second user are available; in response to failing to identify any timeslots before the deadline of the event during which both the first user and the second user are available, determining, based at least on the scheduling data, that at least one of the first user and the second user are scheduled to attend another event during the upcoming timeslot, the upcoming timeslot being before the deadline of the event; and moving the other event to an alternate timeslot that is before a deadline of the other event.

In some variations, the identification of the first site for the event can include: identifying, based at least on the scheduling data, the first site and a second site as being unoccupied during the upcoming timeslot; determining a first distance from a first future location of the first user and a second future location of the second user to the first site; determining a second distance from the first future location of the first user and the second future location of the second user to the second site; and selecting the first site instead of the second site based at least on the first distance being less than the second distance.

In some variations, the method can include: determining, based at least the current location of the first user and the second user, a current distance between the first user and the second user; determining, based at least on the future location of the first user and the second user, a future distance between the first user and the second user; and determining to hold the event as a virtual meeting in response to the current distance and/or the future distance exceeding a threshold value.

In some variations, the method can include updating the scheduling data, the scheduling data being updated to indicate the site as being occupied during the upcoming timeslot, the scheduling data further being updated to indicate that the first user and the second user as being located at the site during the upcoming timeslot.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a block diagram illustrating a computing system, in accordance with some example embodiments.

When practical, similar reference numbers denote similar structures, features, or elements.

DETAILED DESCRIPTION

A calendar application may provide scheduling functionalities such as, for example, reserving a particular timeslot for an event. However, a conventional calendar application has limited access to data. For example, a conventional calendar application may only be aware of its user's schedule, which is typically provided directly by the user as the user reserves different timeslots for various events. As such, for an event with multiple participants, the calendar application cannot identify a timeslot for holding an event because the calendar application does not have the availability of other participants besides the user of the calendar application. Furthermore, a conventional calendar application tends to be location agnostic. Thus, the calendar application also cannot determine an optimal site for holding the event.

In some implementations of the current subject matter, a scheduler can be configured to determine a timeslot and/or a site for holding an event. The scheduler can determine the timeslot and/or the site for holding the event based on sensor data that includes, for example, occupancy data from IoT devices and/or location data from mobile devices. Alternately and/or additionally, the scheduler can determine the timeslot and/or the site for holding the event based on scheduling data that indicates, for example, the sites and/or participants for one or more scheduled events.

Figure 1:
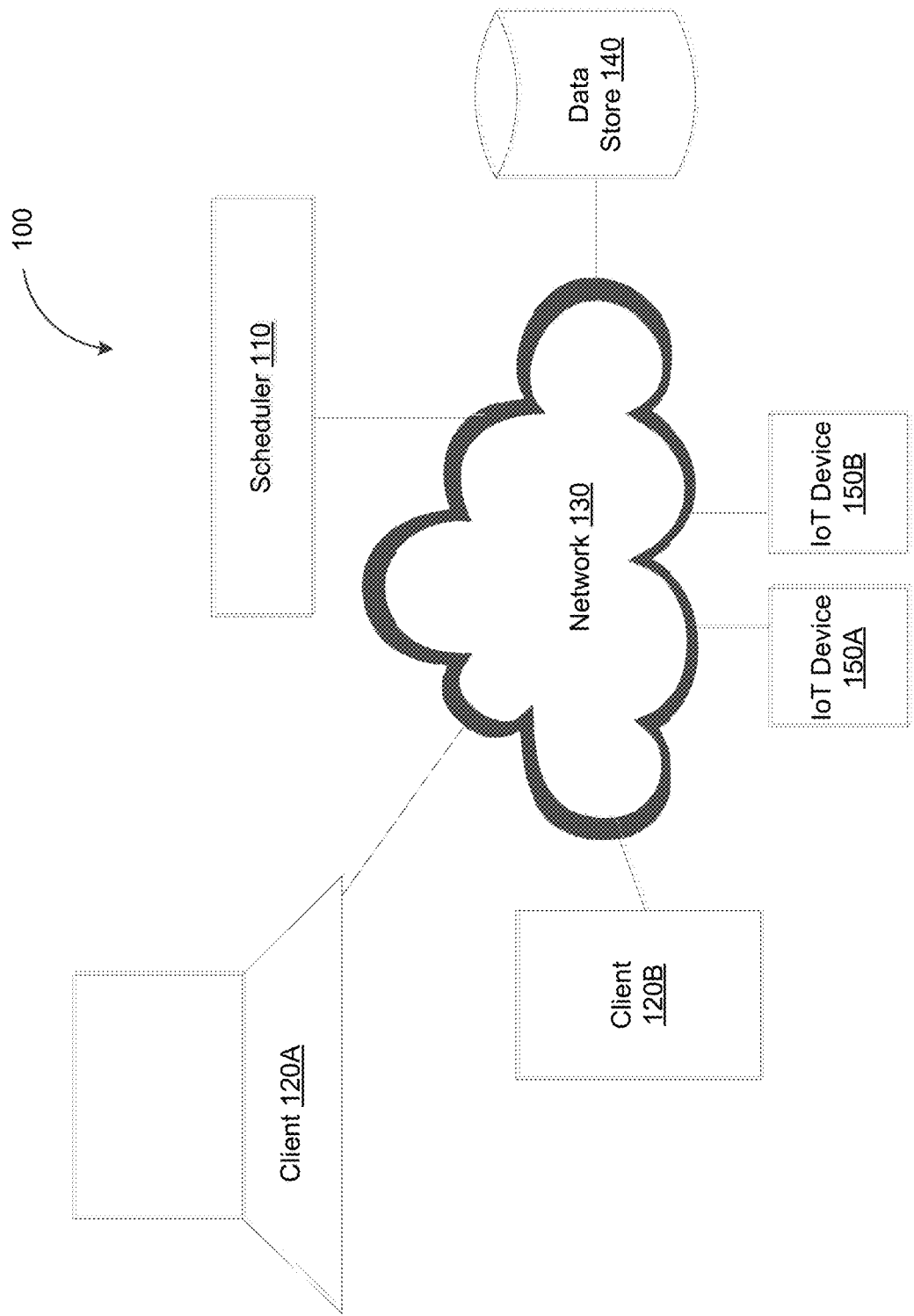
FIG. 1 depicts a block diagram illustrating an IoT scheduling system consistent with implementations of the current subject matter.

FIG. 1 depicts a block diagram illustrating an IoT scheduling system 100 consistent with some implementations of the current subject matter. Referring to FIG. 1, a scheduler 110 can be communicatively coupled, via a wired and/or wireless network 130, with a first client 120A, a second client 120B, a data store 140, a first IoT device 150A, and a second IoT device 150B. The wired and/or wireless network 130 may be a public land mobile network (PLMN), a local area network (LAN), a wide area network (WAN), a point-to-point link, the Internet, and/or the like.

The first client 120A and/or the second client 120B can be any device that includes at least one processor and at least one memory including program code. For example, the first client 120A and/or the second client 120B can be a computer, a tablet, a mobile device, a smart phone, and/or a wearable device (e.g., smart watch). The first IoT device 150A and the second IoT device 150B can be any data collection device configured with network connectivity. For instance, the first IoT device 150A and/or the second IoT device 150 can be sensors (e.g., motion detectors) configured to monitor the occupancy of event sites. It should be appreciated that the occupancy of an event site can correspond to the physical presence of one or more individuals at the event site. The data store 140 can be a database management system (DBMS) that is coupled with an in-memory database, a relational database, and/or any other types of persistence.

The scheduler 110 can access data at the first client 120A, the second client 120B, the data store 140, the first IoT device 150A, and/or the second IoT device 150B. This data may enable the scheduler 110 to determine one or more timeslots for an event. The scheduler 110 may receive, from the first client 120A and/or the second client 120B, a request to schedule an event. The request may include one or more requirements for the event including, for example, the required participants and a deadline for the event. For example, the request to schedule the event may indicate that the event requires attendance by both a first user of the first client 120A and a second user of the second client 120B. It should be appreciated that this request may be speech-based and/or text-based. For example, the first user of the first client 120A and/or the second user of the second client 120B can dictate and/or enter the request to schedule the event.

In some implementations of the current subject matter, the scheduler 110 can access the data from calendar applications and/or planner applications associated with the first user and the second user. This data may be available from the first client 120A, the second client 120B, and/or the data store 140. The scheduler 110 can identify, based on the respective availability of the first user and the second user, one or more timeslots before the deadline during which both the first user and the second user are available to participate in the event.

In some implementations of the current subject matter, the scheduler 110 may be unable to identify any timeslot before the deadline during which both the first user of the first client 120A and the second user of the second client 120B are available to participate in the event. As such, the scheduler 110 can determine changes to the first user's schedule and/or the second user's schedule that would enable the first user and the second user to both participate in the event before the deadline. These schedule changes can include moving, based on the urgency of another event, an existing timeslot of the other event. For example, the other event can be moved to an earlier and/or a later timeslot that is before the deadline specified for the other event. Accordingly, the scheduler 110 can suggest, to the participants of the other event, a change to the existing timeslot of the event.

In some implementations of the current subject matter, the scheduler 110 can adjust the existing timeslot for the event in response to changes to the participants of the event. For example, the scheduler 110 may receive an indication to add one or more additional participants to the event and/or remove one or more existing participants from the event. In response to receiving the indication to add and/or remove participants, the scheduler 110 can determine a new timeslot for the event. The scheduler 110 can determine the new timeslot by accessing data from calendar applications and/or planner applications associated with each participant. Here, the scheduler 110 can identify, based on the respective availability of the participants, at least one new timeslot before the deadline during which all of the participants are available to participate in the event. Alternately and/or additionally, when the scheduler 110 cannot identify a new timeslot based on the current availability of all event participants, the scheduler 110 can determine changes to the current schedule of one or more participants that would enable all participants to attend the event before the deadline.

In some implementations of the current subject matter, the scheduler 110 can identify and/or book one or more sites, such as offices and/or conference rooms, for holding the event. For example, the scheduler 110 can access scheduling data for a plurality of sites. This scheduling data may be available, for example, by querying the data store 140. Furthermore, this scheduling data can include booking information corresponding to which sites are reserved for one or more planned events and the duration of these reservations. The scheduler 110 can determine, based on the scheduling data, the timeslots during which one or more sites are available before the deadline associated with the event. The scheduler 110 can further merge the site availability with the availability of the participants. For example, the scheduler 110 may choose a first site over a second site if the first site is available for a timeslot during which both the first user of the first client 120A and the second user of the second client 120B are available to participate in the event. According to some implementations of the current subject matter, the scheduler 110 can update the scheduling data in the data store 140 to indicate that a particular site is reserved for the timeslot of the event.

Alternately and/or additionally, one or more sites for holding an immediate event can be identified based on current location data from the first client 120A and/or the second client 120B as well as current occupancy data from the first IoT device 150A and/or the second IoT device 150B. As used herein, an immediate event may be an event that is scheduled to occur right now instead of in the future. For example, the scheduler 110 can identify, based on the occupancy data from first IoT device 150A and/or the second IoT device 150B, one or more sites that are currently unoccupied and available. The scheduler 110 can be further configured to identify an optimal site for the event based on the respective current locations of the first client 120A and/or the second client 120B relative to the locations of the available sites. For example, the scheduler 110 can determine a path from the location of the first client 120A to a first site, a path from the location of the first client 120A to a second site, a path from the location of the second client 120B to the first site, and a path from the location of the first client 120B to the second site. The scheduler 110 can select the first site instead of the second site if the two paths to the first site are shorter than the two paths to the second site.

In some implementations of the current subject matter, the scheduler 110 can determine, based on the current locations of the first client 120A and/or the second client 120B and the timeslot for the event, that the first user of the first client 120A and/or the second user of the second client 120B cannot attend the event in person. For example, the current locations of the first client 120A and/or the second client 120B may indicate that the first client 120A is too distant from the second client 120B for the first user and the second user to meet in person at the timeslot for the event. As such, the scheduler 110 can be configured to set up a virtual meeting between the first user and the second user instead of selecting a physical location, such as a conference room or an office, for holding the event.

In some implementations of the current subject, the scheduler 110 can notify the first client 120A and/or the second client 120B of the time and site for the event. For example, the notification can include updating the calendar application and/or planner application at the first client 120A and/or the second client 120B. Alternately and/or additionally, the notification can include sending, to the first client 120A and/or the second client 120B, a meeting request that specify the time and the site for the event.

In some implementations of the current subject matter, the scheduler 110 can provide location updates based on real time IoT data including, for example, a current position (e.g., GPS location) of the participants with respect to the site of an event. For example, the scheduler 110 can send, to the first client 120A and/or the second client 120B, one or more updates for reducing the walking path of the participants to the site of the event. According to some example embodiments, the scheduler 110 can communicate such updates via, for example, a user interface at the first client 120A and/or the second client 120B. It should be appreciated that these updates may include any information relevant to the event including, for example, navigation information to the site of the event.

In some implementations of the current subject matter, the scheduler 110 can be configured to connect the participants of the event in instances where the event is scheduled to be online only. For example, the scheduler 110 can automatically establish a connection (e.g., voice over IP, video over IP, and/or the like) between the first client 120A and the second client 120B at the scheduled time for the event. Establishing the connection between the first client 120A and the second client 120B can include launching a voice and/or video conferencing application at each of the first client 120A and the second client 120B at the scheduled time for the event.

In some implementations of the current subject matter, the scheduler 110 can be configured to release a site based on one or more release rules. Releasing the site can include marking the site as unoccupied and/or available such that the scheduler 110 can use the site for another event. For example, the scheduler 110 can monitor a site that is connected by an IoT device such as, for example, the first IoT device 150A and/or the second IoT device 150B. The scheduler 110 may apply one or more release rules with respect to site. For example, in accordance with one example release rule, the scheduler 110 may release the site if occupancy data from the first IoT device 150A and/or the second IoT device 150B indicate that the site is unoccupied more than a threshold quantity of time (e.g., 10 minutes) after the scheduled start of an event held at the site.

Alternately and/or additionally, the scheduler 110 can monitor the location of the event's participants. For instance, the users of the first client 120A and/or the second client 120B may be participants of an event scheduled at a site. As such, the scheduler 110 can monitor the respective locations (e.g., GPS location) of the first client 120A and/or the second client 120B relative to the site of the event. The scheduler 110 can release the site if the locations of the first client 120A and/or the second client 120B indicate that the participants of the event are not at the site at the scheduled start of the event and/or more than a threshold amount of time (e.g., 10 minutes) past the scheduled start of the event.

In some example embodiments, the scheduler 110 can schedule an event for an immediate timeslot at a site that is immediately available. For example, the scheduler 110 can respond to a voice request for a conference room that is available immediately by identifying, based on occupancy data from the first IoT device 150A and/or the second IoT device 150B, a site that is currently unoccupied. The scheduler 110 can query the data store 140 in order to retrieve scheduling data for determining a start time for the next event scheduled to be held at the site. Determining the start time for the next scheduled event can enable the scheduler 110 to determine an amount of time during which the site will remain unoccupied. For instance, the scheduler 110 can identify, based on occupancy data from the first IoT device 150A and/or the second IoT device 150B, a conference room as being currently unoccupied. The scheduler 110 can further determine, based on scheduling data retrieved by querying the data store 140, the start time for the next event scheduled to be held in this conference room. Accordingly, the scheduler 110 can determine that the conference room is currently unoccupied and will remain unoccupied for the next 30 minutes.

Figure 2:
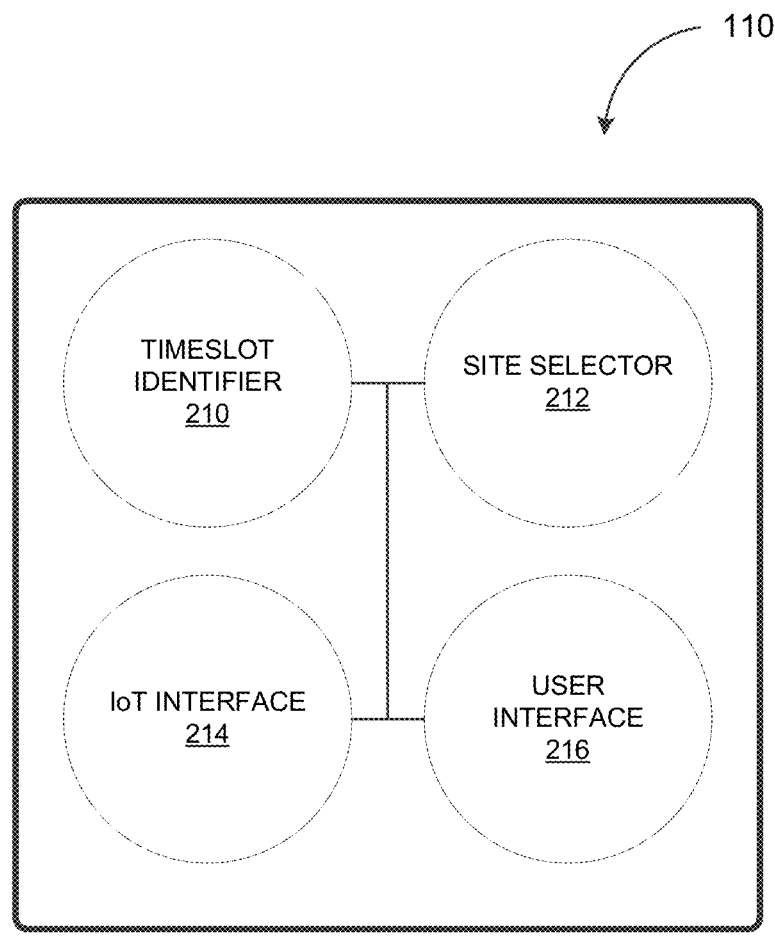
FIG. 2 depicts a block diagram illustrating a scheduler consistent with implementations of the current subject matter.

FIG. 2 depicts a block diagram illustrating the scheduler 110, in accordance with some example embodiments. Referring to FIGS. 1-2, the scheduler 110 may include a timeslot identifier 210, a site selector 212, an IoT interface 214, and a user interface 216. It should be appreciated that the scheduler 110 can include additional and/or different components than shown.

The timeslot identifier 210 can be configured to identify one or more timeslots for holding an event. The scheduler 110 may receive a request to schedule an event that requires attendance by a plurality of participants. Moreover, the request may indicate that the event must be held before a certain deadline. As such, the timeslot identifier 210 can determine one or more timeslots before the deadline during which all required participants are available to attend the event.

Figure 3A:
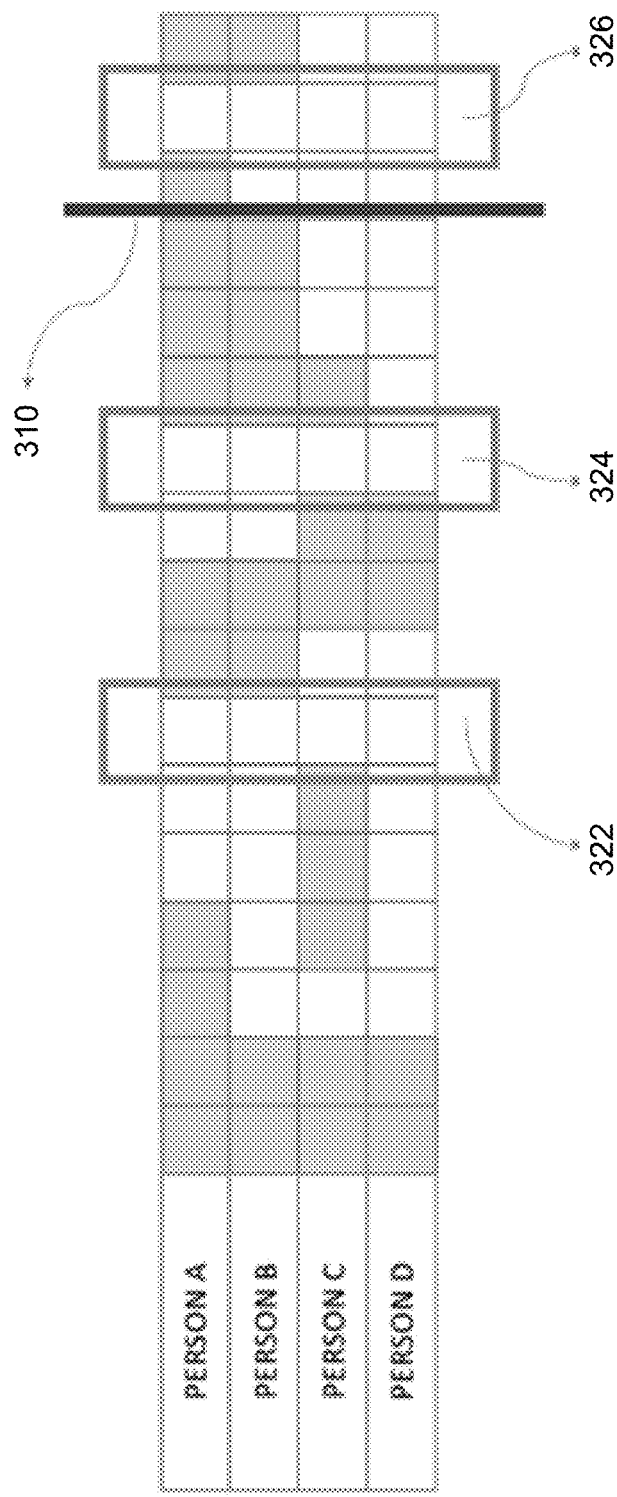
FIG. 3A depicts availability-based scheduling consistent with implementations of the current subject matter.

To further illustrate, FIG. 3A depicts availability-based scheduling consistent with implementations of the current subject matter. As noted above, the timeslot identifier 210 can be configured to perform availability-based scheduling in order to identify one or more timeslots before a deadline for an event during which all required participants for the event are able to attend the event. It should be appreciated that the one or more timeslots can include an immediate timeslot for holding the event immediately if all required participants are available. Referring to FIG. 3A, the event can require attendance by Person A, Person B, Person C, and Person D. Furthermore, the event is associated with a deadline 310 before which the event is required to take place. The timeslot identifier 210 can access scheduling data associated with Person A, Person B, Person C, and Person D. For example, the timeslot identifier 210 can access calendar applications associated with Person A, Person B, Person C, and Person D. Based on this scheduling data, the timeslot identifier 210 can identify a first timeslot 322, a second timeslot 324, and a third timeslot 326 during which Person A, Person B, Person C, and Person D are all free to attend the event. However, the third timeslot 324 is after the deadline 310 associated with the event. As such, the timeslot identifier 210 may propose both the first timeslot 322 and the second timeslot 324 as possible timeslots for holding the event. Alternately and/or additionally, the timeslot identifier 210 may propose the earliest possible timeslot (e.g., the first timeslot 322).

In some implementations of the current subject matter, the timeslot identifier 210 may determine possible adjustments the schedules of Person A, Person B, Person C, and/or Person D in order to identify a timeslot for holding the event. For example, the timeslot identifier 210 may be initially unable to find a timeslot during which Person A, Person B, Person C, and Person D are all available to attend the event. As such, the timeslot identifier 210 may identify one or more other events in the schedules of Person A, Person B, Person C, and/or Person D that can be moved to a different timeslot in order to accommodate the event. For instance, the timeslot identifier 210 may propose to move another event in Person A's schedule to a different timeslot in order to free up the other event's current timeslot. Here, the timeslot identifier 210 may move the other event to the different timeslot if the move does not postpone the other event beyond the other event's deadline.

In some implementations of the current subject matter, the site selector 212 can be configured to identify one or more sites for holding the event. The site selector 212 can identify the one or more sites based on the current and/or future availability of the sites. For example, for a future event, the site selector 212 can query the data store 140 in order to retrieve scheduling data for one or more planned events. This scheduling data may indicate which sites are reserved for the planned events and for how long. For an immediate event, the site selector 212 can access occupancy data from the first IoT device 150A and/or the second IoT device 150B indicative of sites that are currently occupied and/or unoccupied by one or more individuals. Alternately and/or additionally, the site selector 212 can identify the one or more sites based on the location of the participants of the event relative to the sites. For instance, the site selector 212 can identify sites that minimize travel time and/or travel distance to and/or from the event.

Figure 3B:
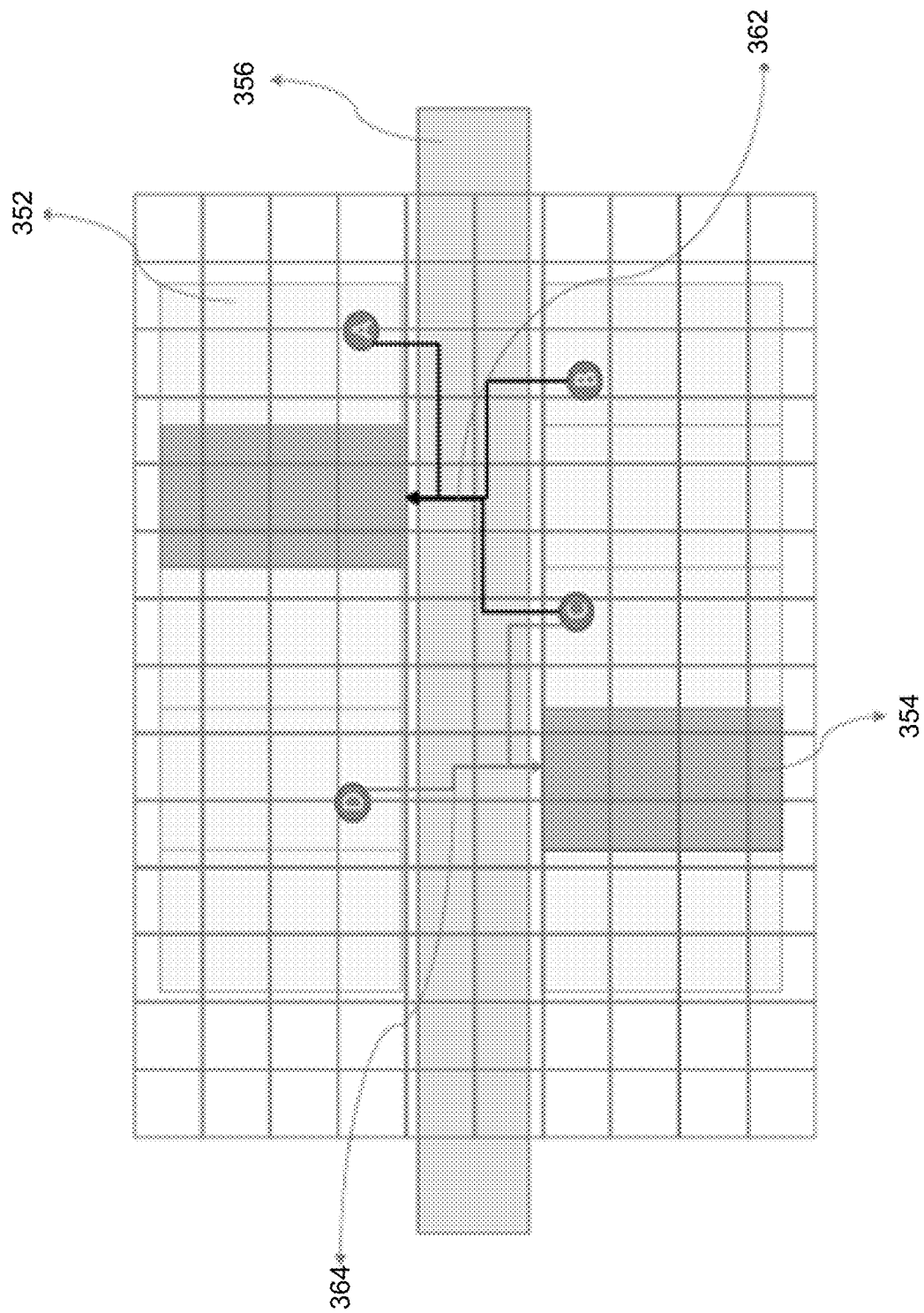
FIG. 3B depicts location-based scheduling consistent with implementations of the current subject matter.

To further illustrate, FIG. 3B depicts location-based scheduling consistent with implementations of the current subject matter. As noted above, the site selector 212 can be configured to perform location-based scheduling in order to identify one or more sites that minimize the travel time and/or travel distance of the participants of the event. According to some implementations of the current subject matter, the site selector 212 can minimize travel time and/or travel distance both to and from the event. That is, site selection for an event may be determined based on the paths of its participants to the site of the event and the paths of its participants leaving the site of the event to travel to the site of one or more subsequent events.

Referring to FIG. 3B, a first event may require attendance by Person A, Person B, and Person C. A second event that is taking place subsequent to the first event may require attendance by Person C and Person D. As such, the site selector 212 may select a site for the first event to minimize the travel time and/or travel distance of Person A, Person B, and Person C to the event. Moreover, the site selector 212 may select the site for the first event to minimize the travel time and/or travel distance of Person C to from the site of the first event to the site of the second event. As shown in FIG. 3B, the site selector 212 can determine a first optimal path 362 for the first event and a second optimal path 364 for the second event. The first optimal path 362 may include the distance that is traveled by Person A, Person B, and Person C to arrive at the site for the first event. The second optimal path 364 may include the distance that is traveled by Person C and Person D to arrive at the site for the second event. The site selector 212 may select the site for the first event based on the first optimal path 362 being a shortest path. Similarly, the site selector 212 may select the site for the second event based on the second optimal path 364 being a shortest path.

It should be appreciated that location-based scheduling can be performed based on scheduling data. As noted earlier, scheduling data can indicate the sites and the participants for one or more scheduled events. For example, scheduling data can indicate the site and the participants for the first event (e.g., Person A, Person B, and Person C). The location of Person A, Person B, and Person C during the timeslot of the first event can correspond to the site of the first event. Similarly, scheduling data can indicate the site and the participants of the second event (e.g., Person C and Person D). The location of Person C and Person D during the timeslot of the second event can correspond to the site of the second event.

In some implementations of the current subject matter, the site selector 212 may measure travel distance in terms of squares of floor space. For example, as shown in FIG. 3B, different areas, such as a first room 352, a second room 354, and a hallway 356, in the interior of an office building may be divided into equal squares. However, it should be appreciated that travel time and/or travel distance may be quantified in any manner without departing from the scope of the present disclosure.

In some implementations of the current subject matter, the site selector 212 can select a virtual meeting for an event based on the locations of the event's participants. For example, if the distance between the locations of the event's participants exceeds a threshold value (e.g., an x number of miles), the site selector 212 can select and/or recommend the event be held as a virtual meeting instead of identifying a physical site for holding the event.

In some implementations of the current subject matter, the site selector 212 can identify one or more sites for holding an event based on the current locations of the event's participants and the current availability of one or more sites. Referring again to FIG. 3B, the first room 352 and the second room 354 may be equipped with IoT devices that provide real time occupancy data for the first room 352 and the second room 354. Moreover, Person A, Person B, Person C, and Person D may all have devices capable of determining the current location (e.g., global positioning system (GPS) coordinates) of Person A, Person B, Person C, and Person D. As such, the site selector 212 can be configured to select a site based on the current locations of Person A, Person B, Person C, and Person D relative to the first room 352 and the second room 354. This site selection can be further based on the current occupancy data from the first room 352 and the second room 354, which may be provided by the first IoT device 150A and/or the second IoT device 150B. For example, the site selector 212 may be configured to select the one of the first room 352 and the second room 354 that minimizes the travel time and/or travel distance for Person A, Person B, Person C, and Person D. However, the site selector 212 may select the first room 352 over the second room 354 if IoT data from the first room 352 indicates that the first room 352 is currently unoccupied and IoT data from the second room 354 indicates that the second room 354 is currently occupied.

In some implementations of the current subject matter, the site selector 212 may change the site that is currently booked for an event if a better site becomes available. For example, the site selector 212 may continue to monitor the availability of different sites as well as the current location of the event's participants. The site selector 212 can change the site for the event if a different site becomes available and the travel time and/or travel distance to the different site is less than that of the original site.

In some implementations of the current subject matter, the IoT interface 214 can be configured to access and/or collect IoT data from a plurality of IoT devices. For example, the IoT interface 214 can include different application programming interfaces (APIs) for accessing data from an IoT device such as, for example, the first IoT device 150A and/or the second IoT device 150B. As noted earlier, data from IoT devices may be used by the timeslot identifier 210 in performing availability-based scheduling and/or by the site selector 212 in performing location-based scheduling.

In some implementations of the current subject matter, the user interface 216 can be configured to interact with one or more users. For example, the user interface 216 can be configured to receive speech-based and/or text-based requests to schedule an event. As noted earlier, a request to schedule an event may stipulate the participants of an event and a deadline for the event. It should be appreciated that the request may both mandatory and optional participants. According to some implementations of the current subject matter, the timeslot identifier 210 may perform availability-based scheduling based on the availability of mandatory participants. Moreover, the site selector 212 can perform location-based scheduling based on the locations of the mandatory participants. For example, the timeslot identifier 210 and the site selector 212 may prioritize mandatory participants over optional participants.

According to some example embodiments, the user interface 216 can respond to contextual triggers to automatically identify the participants of an event. For example, the user interface 216 can be configured to detect user interactions with respect to an email. These user interactions can indicate when the email should be used to provide the context for the event. Thus, upon detecting such user interactions, the user interface 216 can extract, from the email, one or more individuals associated with the email and/or corresponding email thread. These individuals may include the senders of the email, the recipients of the email, and/or individuals whose names appear in the email. Furthermore, the user interface 216 can identify and/or propose these individuals as participants for the event. As one example, the user interface 216 can detect, during the reading of an email, voice instructions to set up a telephone call as soon as possible starting tomorrow. The user interface 216 can respond to this user interaction by applying current email as a context and setting up a telephone call with all the individuals involved in the current email and/or a corresponding email thread.

In some implementations of the current subject matter, the user interface 216 may be further configured to provide notifications to the participants of the event. For example, the user interface 216 can send, to the participants of the event, meeting requests that indicate the timeslot and site for the event. Alternately and/or additionally, the user interface 216 can update the calendar applications associated with the participants of the event. For instance, the user interface 216 can reserve the timeslot associated with the event.

Figure 4:
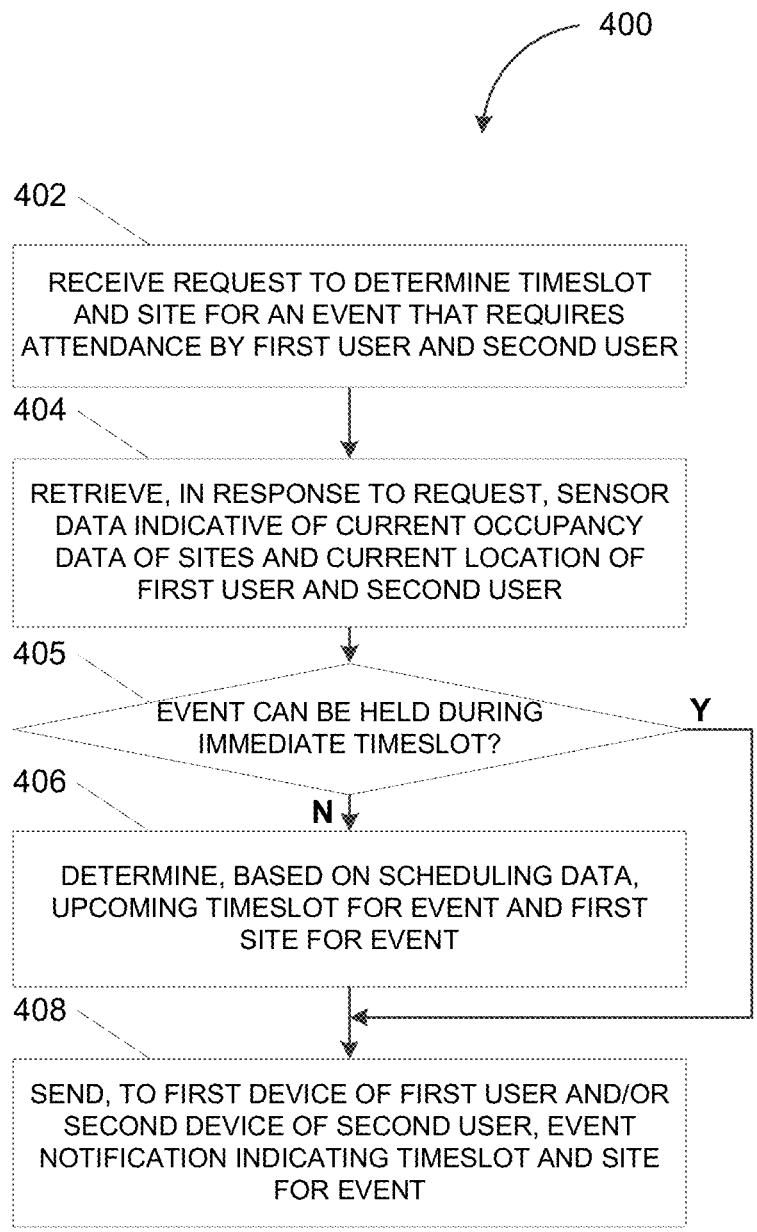
FIG. 4 depicts a flowchart illustrating a process for IoT based scheduling consistent with implementations of the current subject matter.

FIG. 4 depicts a flowchart illustrating a process 400 for IoT based scheduling consistent with implementations of the current subject matter. Referring to FIGS. 1-4, the process 400 can be performed by the scheduler 110.

The scheduler 110 can receive a request to determine a site and a timeslot for an event that requires attendance by a first user and a second user (402). For instance, the scheduler 110 may receive, from the first client 120A and/or the second client 120B, a request to schedule the event. The request may indicate event requirements. For example, the event may require attendance by both the first user and the second user. The request may further indicate a deadline for scheduling the event and requirements for a duration of the event. The first user may be associated with the first client 120A and the second user may be associated with the second client 120B.

The scheduler 110 can respond to the request by retrieving sensor data indicative of a current occupancy of a plurality of sites and a current location of the first user and the second user (404). For example, the scheduler 110 can respond to the request by identifying an earliest possible timeslot for holding the event. The earliest possible timeslot for holding the event may include a timeslot for holding the event immediately, when the first user and second user are immediately available. The scheduler 110 can identify this immediate timeslot based on scheduling data. Further, the scheduler 110 may identify, based on the retrieved sensor data, whether a site from the plurality of sites is available for this immediate times slot. This sensor data can include occupancy data from the first IoT device 150A and/or the second IoT device 150B indicating whether the corresponding sites are currently unoccupied. Alternately and/or additionally, this sensor data can include location data from the first client 120A and/or the second client 120B indicating a current location of the users required to attend the event.

The scheduler 110 can determine, based at least on the scheduling data, whether the event can be held during an immediate timeslot (405). Further, the scheduled 110 can determine, based at least on sensor data, whether there is an available site from the plurality of sites for holding the event during the determined immediate time slot. In some implementations of the current subject matter, the scheduler 110 can determine whether the event can be held during an immediate timeslot based on sensor data that includes, for example, occupancy data from the first IoT device 150A and/or the second IoT device 150B as well as location data from the first client 120A and/or the second client 120B. In one embodiment, based on the location data for the first client 120A and the second client 120B, a physical distance between the attendees may be computed and evaluated. The determined physical distance may be compared with a threshold value, and when the threshold value is exceeded, the available location for holding the event may be determined to be at least a virtual location.

The scheduler 110 can determine that the event cannot be held during the immediate timeslot (405-N). In some embodiments, the scheduler 110 can determine that the event cannot be held during the immediate timeslot if scheduling data indicates that at least one of the required participants for the event is not available immediately. In some implementations of the current subject matter, the scheduler 110 can determine that the event cannot be held during the immediate timeslot even if the required participants for the event are available immediately. The scheduler 110 can determine if the occupancy data from the first IoT device 150A and/or the second IoT device 150B indicate that no sites are currently unoccupied. Alternately and/or additionally, the occupancy data from the first IoT device 150A and/or the second IoT device 150B may indicate at least one site that is currently unoccupied but the corresponding scheduling data may indicate that this site is not unoccupied for the entire duration of the event as another event scheduled to be held at the site overlaps in time with the event.

In response to the determining that the event cannot be held during the immediate timeslot, the scheduler 110 can identify, based on scheduling data, an upcoming timeslot for the event and a first site for the event (406). The scheduler 110 can further send, to a first device of the first user and/or a second device of the second user, a notification of the event indicating the timeslot and the site for the event (408). For example, when the event cannot be held immediately, the scheduler 110 can determine a timeslot and a site for holding the event at a later time. The scheduler 110 can determine a future timeslot and site for holding the event based on scheduling data, which includes future occupancy data for various sites and the future location of the required participants of the event. As noted earlier, scheduling data may provide the sites and/or participants of one or more scheduled events. The future location of a user can correspond to the sites of the one or more events the user is scheduled to participate in. Furthermore, it should be appreciated that the scheduler 110 can determine a site for holding the event that minimizes the travel time and/or travel distance required for each participant of the event. When the scheduler 110 determines the timeslot and the site for the event, the scheduler 110 can send, to the first client 120A and/or the second client 120B, an event notification indicating the timeslot and the site for holding the event.

Alternately and/or additionally, the scheduler 110 can determine that the event can be held during the immediate timeslot (405-Y). As such, the process 400 continues at operation 408 where the scheduler 110 sends, to the first device of the first user and/or the second device of the second user, a notification of the event indicating the timeslot and the site for the event. For example, the scheduler 110 can determine that the event can be held immediately when at least one site is currently unoccupied and remains unoccupied for the duration of the event, and when all required participants of the event are available immediately to attend the event. In some implementations of the current subject matter, the scheduler 110 can identify multiple sites for holding the event immediately because these sites are both currently unoccupied and will remain unoccupied for the duration of the event. As such, the scheduler 110 can select one of the currently unoccupied sites based on the travel time and/or travel distance required for each of the currently unoccupied sites. The scheduler 110 can select a site that minimizes the travel time and/or travel distance required for each participant of the event. Furthermore, when the scheduler 110 determines the timeslot and the site for the event, the scheduler 110 can send, to the first client 120A and/or the second client 120B, an event notification indicating the timeslot and the site for holding the event.

FIG. 5 depicts a block diagram illustrating a computing system 500 consistent with implementations of the current subject matter. Referring to FIGS. 1 and 5, the computing system 500 can be used to implement the scheduler 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the scheduler 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
   receiving a request to identify a site and a timeslot for an event, the event requiring attendance by at least a first user and a second user;
   responding to the request by at least
      querying a database to retrieve a scheduling data of an occupancy of each of a plurality of sites and an availability of each of the first user and the second user;
      retrieving, from one or more motion detectors, a sensor data indicative of a current occupancy of the plurality of sites, and
      retrieving, from a first mobile device associated with the first user and a second mobile device associated with the second user, a global positioning system (GPS) data indicative of a current location of each of the first user and the second user;
   in response to the scheduling data indicating the first user and second user being available during a current timeslot for the event, automatically identifying the current timeslot as the timeslot for the event, identifying, based at least on the sensor data, a first site from the plurality of sites that is currently unoccupied as the site for the event, and marking the first site as unavailable for another event including by querying the database to update the scheduling data to indicate the first site as being occupied during the timeslot of the event;
   monitoring, based at least on the global positioning system data, the current location of each of the first user and the second user relative to the first site;
   in response to determining, based on the monitoring, that the first user and the second user are not located at the first site after more than a threshold quantity of time has passed since a start time of the current timeslot, determining that the first user and the second user are unavailable for the current timeslot, and automatically marking the first site as available for another event including by querying the database to update the scheduling data to indicate the first site as being unoccupied during the timeslot of the event;
   in response to the first user and the second user being unavailable during the current timeslot for the event, automatically identifying, based at least on the scheduling data, a subsequent timeslot for the event and the site for holding the event during the subsequent timeslot, the site being a second site from the plurality of sites in response to the scheduling data indicating that a future distance between the first user and the second user does not exceed a threshold value, and the site being a virtual location in response to the scheduling data indicating that the future distance between the first user and the second user exceeds the threshold value past a deadline of the event;
   in response to the first user being a mandatory participant and the second user being an optional participant, selecting the site to minimize a distance traveled by the first user in order to reach the site, the selecting includes determining a first distance from the current location of the first user to the first site and a second distance from the current location of the first user a third site, and selecting the first site instead of the third site based at least on the first distance being less than the second distance;
   sending, to the first mobile device of the first user and the second mobile device of the second user, a notification for the event, the notification including the timeslot and the site for holding the event;
   in response to the site being the virtual location, automatically establishing a connection between the first client and the second client at a start of the timeslot for the event, the connection being established by at least launching, at each of the first client and the second client, a voice conferencing application and/or a video conferencing application; and
   automatically querying the database to update the scheduling data to indicate the site of the event as being occupied during the timeslot of the event, the first user and the second user as being unavailable during the timeslot of the event, and the first user and the second user as being located at the site of the event during the timeslot of the event.

2. The computer-implemented method of claim 1, further comprising:
   determining whether the first site is available for holding the event during the current timeslot including by
      determining, based at least on the sensor data, whether at least one of the plurality of sites is currently unoccupied, and
      determining, based at least on the scheduling data, whether the first user and the second user are available during the current timeslot.

3. The computer-implemented method of claim 1, further comprising:
   identifying, based at least on the scheduling data, a third site of the plurality of sites as being unoccupied during the subsequent timeslot; and
   identifying the second site for holding the event instead of the third site in response to determining, based at least on the scheduling data, that the third site is not unoccupied for an entire duration of the event.

4. The computer-implemented method of claim 1, wherein the first distance and the second distance are determined based at least on the global positioning system data.

5. The computer-implemented method of claim 1, wherein the identification of the subsequent timeslot comprises:

identifying, based at least on the scheduling data, at least one timeslot before a deadline of the event during which both the first user and the second user are available;

in response to failing to identify any timeslots before the deadline of the event during which both the first user and the second user are available, determining, based at least on the scheduling data, that at least one of the first user and the second user are scheduled to attend another event during the subsequent timeslot, the subsequent timeslot being before the deadline of the event; and moving the other event to an alternate timeslot that is before a deadline of the other event.

6. The computer-implemented method of claim 1, wherein the second site for holding the event during the subsequent timeslot is identified by at least:

identifying, based at least on the scheduling data, the second site and a third site as being unoccupied during the subsequent timeslot;

determining a first distance from a first future location of the first user and a second future location of the second user to the second site;

determining a second distance from the first future location of the first user and the second future location of the second user to the third site; and selecting the second site instead of the third site based at least on the first distance being less than the second distance.

7. The computer-implemented method of claim 1, further comprising:

determining, based at least the current location of the first user and the second user, the current distance between the first user and the second user; and determining, based at least on the future location of the first user and the second user, the future distance between the first user and the second user.

8. A system, comprising:

at least one data processor; and at least one memory storing instructions which, when executed by the at least one data processor, result in operations comprising:

receiving a request to identify a site and a timeslot for an event, the event requiring attendance by at least a first user and a second user;

responding to the request by at least querying a database to retrieve a scheduling data of an occupancy of each of a plurality of sites and an availability of each of the first user and the second user;

retrieving, from one or more motion detectors, a sensor data indicative of a current occupancy of the plurality of sites, and retrieving, from a first mobile device associated with the first user and a second mobile device associated with the second user, a global positioning system (GPS) data indicative of a current location of each of the first user and the second user;

in response to the scheduling data indicating the first user and second user being available during a current timeslot for the event, automatically identifying the current timeslot as the timeslot for the event, identifying, based at least on the sensor data, a first site from the plurality of sites that is currently unoccupied as the site for the event, and marking the first site as unavailable for another event including by querying the database to update the scheduling data to indicate the first site as being occupied during the timeslot of the event;

monitoring, based at least on the global positioning system data, the current location of each of the first user and the second user relative to the first site;

in response to determining, based on the monitoring, that the first user and the second user are not located at the first site after more than a threshold quantity of time has passed since a start time of the current timeslot, determining that the first user and the second user are unavailable for the current timeslot, and automatically marking the first site as available for another event including by querying the database to update the scheduling data to indicate the first site as being unoccupied during the timeslot of the event;

in response to the first user and the second user being unavailable during the current timeslot for the event, automatically identifying, based at least on the scheduling data, a subsequent timeslot for the event and the site for holding the event during the subsequent timeslot, the site being a second site from the plurality of sites in response to the scheduling data indicating that a future distance between the first user and the second user does not exceed a threshold value, and the site being a virtual location in response to the scheduling data indicating that the future distance between the first user and the second user exceeds the threshold value past a deadline of the event;

in response to the first user being a mandatory participant and the second user being an optional participant, selecting the site to minimize a distance traveled by the first user in order to reach the site, the selecting includes determining a first distance from the current location of the first user to the first site and a second distance from the current location of the first user a third site, and selecting the first site instead of the third site based at least on the first distance being less than the second distance;

sending, to the first mobile device of the first user and the second mobile device of the second user, a notification for the event, the notification including the timeslot and the site for holding the event;

in response to the site being the virtual location, automatically establishing a connection between the first client and the second client at a start of the timeslot for the event, the connection being established by at least launching, at each of the first client and the second client, a voice conferencing application and/or a video conferencing application; and automatically querying the database to update the scheduling data to indicate the site of the event as being occupied during the timeslot of the event, the first user and the second user as being unavailable during the timeslot of the event, and the first user and the second user as being located at the site of the event during the timeslot of the event.

9. The system of claim 8, further comprising:

determining whether the first site is available for holding the event during the current timeslot including by determining, based at least on the sensor data, whether at least one of the plurality of sites is currently unoccupied, and determining, based at least on the scheduling data, whether the first user and the second user are available during the current timeslot.

10. The system of claim 8, further comprising:
identifying, based at least on the scheduling data, a third site of the plurality of sites as being unoccupied during the subsequent timeslot; and
identifying the second site for holding the event instead of the third site in response to determining, based at least on the scheduling data, that the third site is not unoccupied for an entire duration of the event.

11. The system of claim 8, further comprising:
wherein the first distance and the second distance are determined based at east on the global positioning system data.

12. The system of claim 8, wherein the identification of the subsequent timeslot comprises:
identifying, based at least on the scheduling data, at least one timeslot before a deadline of the event during which both the first user and the second user are available;
in response to failing to identify any timeslots before the deadline of the event during which both the first user and the second user are available, determining, based at least on the scheduling data, that at least one of the first user and the second user are scheduled to attend another event during the subsequent timeslot, the subsequent timeslot being before the deadline of the event; and
moving the other event to an alternate timeslot that is before a deadline of the other event.

13. The system of claim 8, wherein the second site for holding the event during the subsequent timeslot is identified by at least:
identifying, based at least on the scheduling data, the second site and a third site as being unoccupied during the subsequent timeslot;
determining a first distance from a first future location of the first user and a second future location of the second user to the second site;
determining a second distance from the first future location of the first user and the second future location of the second user to the third site; and
selecting the second site instead of the third site based at least on the first distance being less than the second distance.

14. The system of claim 8, further comprising:
determining, based at least the current location of the first user and the second user, the current distance between the first user and the second user; and
determining, based at least on the future location of the first user and the second user, the future distance between the first user and the second user.

15. A non-transitory computer-readable storage medium including program code, which when executed by at least one data processor, cause operations comprising:
receiving a request to identify a site and a timeslot for an event, the event requiring attendance by at least a first user and a second user;
responding to the request by at least
querying a database to retrieve a scheduling data of an occupancy of each of a plurality of sites and an availability of each of the first user and the second user;
retrieving, from one or more motion detectors, a sensor data indicative of a current occupancy of the plurality of sites, and
retrieving, from a first mobile device associated with the first user and a second mobile device associated with the second user, a global positioning system (GPS) data indicative of a current location of each of the first user and the second user;
in response to the scheduling data indicating the first user and second user being available during a current timeslot for the event, automatically identifying the current timeslot as the timeslot for the event, identifying, based at least on the sensor data, a first site from the plurality of sites that is currently unoccupied as the site for the event, and marking the first site as unavailable for another event including by querying the database to update the scheduling data to indicate the first site as being occupied during the timeslot of the event;
monitoring, based at least on the global positioning system data, the current location of each of the first user and the second user relative to the first site;
in response to determining, based on the monitoring, that the first user and the second user are not located at the first site after more than a threshold quantity of time has passed since a start time of the current timeslot, determining that the first user and the second user are unavailable for the current timeslot, and automatically marking the first site as available for another event including by querying the database to update the scheduling data to indicate the first site as being unoccupied during the timeslot of the event;
in response to the first user and the second user being unavailable during the current timeslot for the event, automatically identifying, based at least on the scheduling data, a subsequent timeslot for the event and the site for holding the event during the subsequent timeslot, the site being a second site from the plurality of sites in response to the scheduling data indicating that a future distance between the first user and the second user does not exceed a threshold value, and the site being a virtual location in response to the scheduling data indicating that the future distance between the first user and the second user exceeds the threshold value past a deadline of the event;
in response to the first user being a mandatory participant and the second user being an optional participant, selecting the site to minimize a distance traveled by the first user in order to reach the site, the selecting includes determining a first distance from the current location of the first user to the first site and a second distance from the current location of the first user a third site, and selecting the first site instead of the third site based at least on the first distance being less than the second distance;
sending, to the first mobile device of the first user and the second mobile device of the second user, a notification for the event, the notification including the timeslot and the site for holding the event;
in response to the site being the virtual location, automatically establishing a connection between the first client and the second client at a start of the timeslot for the event, the connection being established by at least launching, at each of the first client and the second client, a voice conferencing application and/or a video conferencing application; and
automatically querying the database to update the scheduling data to indicate the site of the event as being occupied during the timeslot of the event, the first user and the second user as being unavailable during the timeslot of the event, and the first user and the second user as being located at the site of the event during the timeslot of the event.

* * * * *